(12) United States Patent
Castandet

(10) Patent No.: US 8,830,659 B2
(45) Date of Patent: Sep. 9, 2014

(54) DEVICE FOR SUPPRESSING INTERFERENCE PHENOMENON BETWEEN CAPACITIVE DETECTION AREAS OF A SENSOR

(75) Inventor: Armand Castandet, Pechabou (FR)

(73) Assignee: Continental Automotive France, Toulouse (FR)

( * ) Notice: Subject to any disclaimer, the term of this patent is extended or adjusted under 35 U.S.C. 154(b) by 1346 days.

(21) Appl. No.: 12/598,472

(22) PCT Filed: Apr. 9, 2008

(86) PCT No.: PCT/EP2008/002789
§ 371 (c)(1),
(2), (4) Date: Nov. 2, 2009

(87) PCT Pub. No.: WO2008/135129
PCT Pub. Date: Nov. 13, 2008

(65) Prior Publication Data
US 2010/0136917 A1    Jun. 3, 2010

(30) Foreign Application Priority Data
May 3, 2007  (FR) ...................... 07 03194

(51) Int. Cl.
| H05K 5/00 | (2006.01) |
| H05K 7/00 | (2006.01) |
| G06F 1/16 | (2006.01) |
| G01D 3/028 | (2006.01) |
| E05B 65/12 | (2006.01) |

(52) U.S. Cl.
CPC ................ *G01D 3/028* (2013.01); *E05B 77/34* (2013.01); *E05B 81/78* (2013.01); *E05B 81/77* (2013.01)
USPC ................ 361/679.01; 324/686; 340/545.4

(58) Field of Classification Search
CPC ........... G06F 1/16; E05B 81/64; E05B 81/76; E05B 81/77; E05B 85/16; E05Y 2400/00; E05Y 2400/10; H03K 2217/96078
USPC ..................... 361/679.01; 340/545.4; 324/686
See application file for complete search history.

(56) References Cited

U.S. PATENT DOCUMENTS

| 6,588,813 B1 * | 7/2003 | Marcarini et al. ............ 292/347 |
| 6,700,393 B2 * | 3/2004 | Haag et al. .................... 324/674 |
| 7,108,301 B2 * | 9/2006 | Louvel ....................... 292/336.3 |

(Continued)

FOREIGN PATENT DOCUMENTS

| EP | 1 465 119 | 10/2004 |
| WO | 03/004809 | 1/2003 |
| WO | 03/071069 | 8/2003 |
| WO | 03/095776 | 11/2003 |

OTHER PUBLICATIONS

International Search Report dated Nov. 5, 2008, from corresponding PCT application.

*Primary Examiner* — Anthony Haughton
(74) *Attorney, Agent, or Firm* — Young & Thompson

(57) ABSTRACT

The invention relates to a device for suppressing the interference phenomena between several detection areas (A, B) of a capacitive sensor (30) submitted to a humid ambient environment, characterised in that it comprises means for preventing the propagation of humidity (50) between the detection areas (A, B) in order to prevent any capacitive coupling between the different areas. The invention also relates to an opening handle (10) for an automobile.

4 Claims, 2 Drawing Sheets

(56) References Cited

U.S. PATENT DOCUMENTS 7,292,051 B2 * 11/2007 Negoro et al. ................ 324/690
8,245,548 B2 * 8/2012 Sibley et al. .................... 70/208

2004/0039511 A1 * 2/2004 Garnault et al. ................ 701/49
2004/0177478 A1 * 9/2004 Louvel ............................ 16/430
2005/0231364 A1 * 10/2005 Nitawaki et al. ........... 340/545.4

* cited by examiner

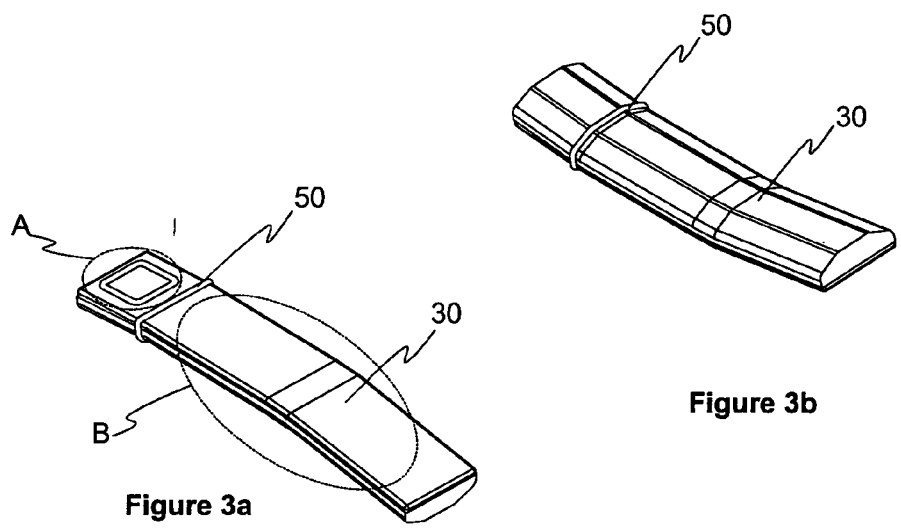
Figure 3a
Figure 3b
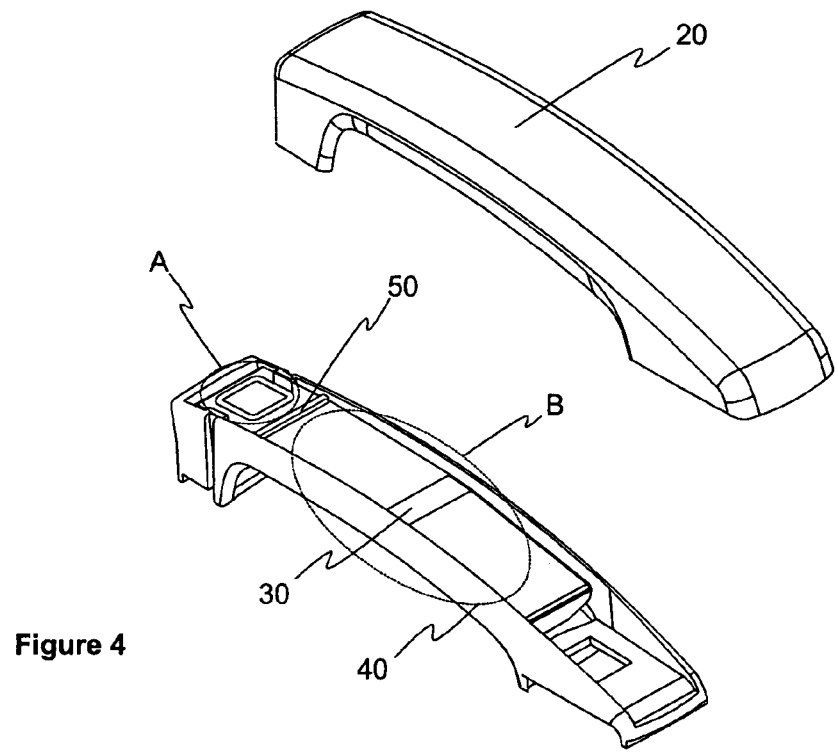
Figure 4

DEVICE FOR SUPPRESSING INTERFERENCE PHENOMENON BETWEEN CAPACITIVE DETECTION AREAS OF A SENSOR The present invention relates to a device for suppressing interference occurring in a capacitive sensor provided with a plurality of detection areas.

BACKGROUND OF THE INVENTION

By way of illustration, but by no means limiting in itself, the present invention will be explained in the motor vehicle field and more specifically in area of access control to a motor vehicle of the "hands free" type.

Currently, the generic operating principle of hands-free type access to a vehicle is as follows:

The vehicle is equipped with means (a computer totally or partly dedicated to this function) for identifying the approach of authorized people (generally wearing an electronic badge capable of dialoging securely with the identification means). A regular and frequent scan is carried out in order to determine whether the badge of an authorized person is in the immediate vicinity of the vehicle.

When an authorized person approaches, the identification means nevertheless wait for said person to actually show the intent to enter before unlocking the opening or openings of the vehicle. The aim of this two-fold check is to allow—for example—an authorized person to pass close to his vehicle without in any way specifically unlocking access thereto or else unlock just one opening.

In this device, one of the means that can be used to determine the actual intent of the authorized person to enter into the vehicle consists in placing in the handle of the openings a proximity sensor that will enable the identification means to be informed (when the authorized person extends the hand toward the handle of the opening). Such a sensor type is, for example, of capacitive type and then sends a proximity detection signal to the identification means. If the two-fold condition stated previously is fulfilled (detection of the authorization in the form of a badge and detection of a part of the body—generally a hand—close to the handle of the opening), then unlocking takes place and access is authorized.

In this particular scenario, the capacitive sensor is incorporated in the handle of the opening.

A recent trend has been to replace, in the opening handles, the mechanical locking and unlocking control with an electronic device. It follows that, on a door handle—for example—two areas are available to the user; the first area is used to open the door by means of a capacitive sensor which detects the proximity of the hand (as described previously) and the second area, also equipped with a capacitive sensor, is used to detect the will of the user to lock or unlock the access to the vehicle.

The use of two capacitive sensors does, however, present a problem of possible interference. Those skilled in the art have partially resolved this drawback by distancing the two sensors from each other within the handle. This makes it possible to have two clearly distinct areas with different effects for the user and to restrict the risks of interference.

Since the dimensions of a vehicle handle are nevertheless inherently restricted, the two sensors are forced to share a common space. This has the effect of creating a real disturbance in case of rain or high atmospheric humidity. In practice, the moisture that infiltrates into the handle creates couplings between the different sensors and erroneous detections then occur.

Those skilled in the art have proposed making the handle watertight by various methods. One of the methods used consists in coating the capacitive sensors in a resin made of plastic material (of polyurethane or of epoxy resins for example). This method is unfortunately long and costly. Furthermore, it is difficult to easily mold sensors of complex forms. One proposed alternative is to facilitate the flow of the water present in order to avoid its presence. This technical solution is not satisfactory because it would entail the presence of flow orifices that are incompatible with the aesthetic demands and facilitates the coupling between the capacitive sensors in very damp atmospheres (rain, mist, etc.) because of the very flow orifices that render said handle non-watertight.

SUMMARY OF THE INVENTION

The present invention aims to remedy the above problems, and at a contained cost.

To this end, the invention firstly targets a device for suppressing the interference phenomenon between a plurality of detection areas of a capacitive sensor subjected to a humid ambient medium, the device being noteworthy in that it comprises means preventing the communication of the moisture between the detection areas so as to avoid the capacitive coupling between the different areas.

By eliminating any possible contact between the areas, the moisture can absolutely be accepted without creating problems. This also makes it possible to dispense with the waterproofing overmolding steps of the prior art.

According to a first embodiment, the means preventing the communication of the moisture are implemented in the mass of the capacitive sensor. It is then possible to assemble the sensor directly in the handle that will accommodate it.

Advantageously, the means preventing the communication of the moisture comprise at least one flexible lip. Said flexible lip (or said flexible lips) will easily ensure the leak-tightness.

According to a second embodiment, the means preventing the communication of the moisture are added to the capacitive sensor upon its assembly. This embodiment presents the benefit of being able to devise a standard capacitive sensor and adapt only the added-on part.

Advantageously, the means preventing the communication of the moisture comprise an added-on seal.

The invention also relates to a handle for opening a motor vehicle equipped with a capacitive sensor having a plurality of detection areas incorporating a device for suppressing the interference phenomenon described previously.

BRIEF DESCRIPTION OF THE DRAWINGS

Other features, aims and benefits of the invention will become apparent from the detailed description that follows with reference to the appended drawings which represent, by way of example, a preferred embodiment thereof. In these drawings:

FIG. 3a is a three-dimensional view of a sensor according to the invention, seen from above with reference to the position of FIG. 1, FIG. 3b is a three-dimensional view of a sensor according to the invention, seen from below with reference to the position of FIG. 1, FIG. 4 is a three-dimensional view of a handle for opening a motor vehicle incorporating the invention, partly assembled.

DETAILED DESCRIPTION OF THE PREFERRED EMBODIMENTS

Figure 1:
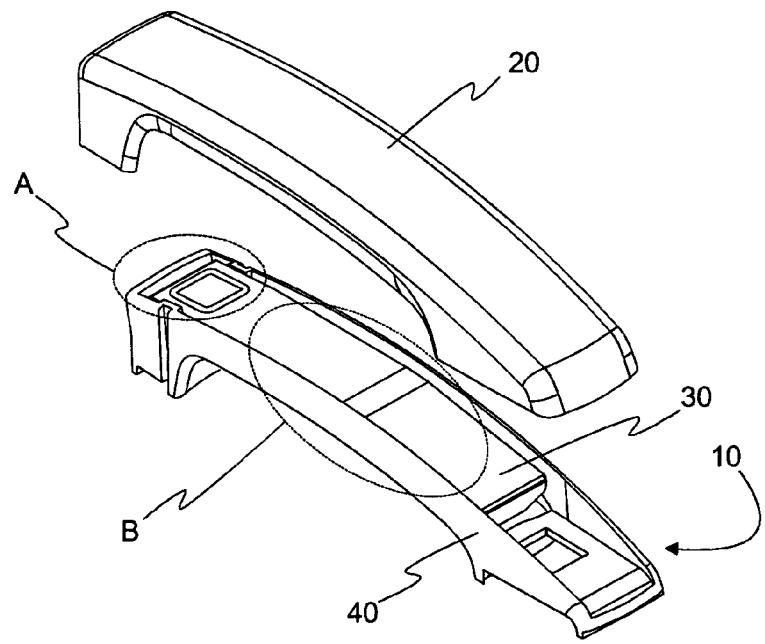
FIG. 1 is a three-dimensional view of an embodiment of the prior art, the handle not being fully assembled.
Figure 2:
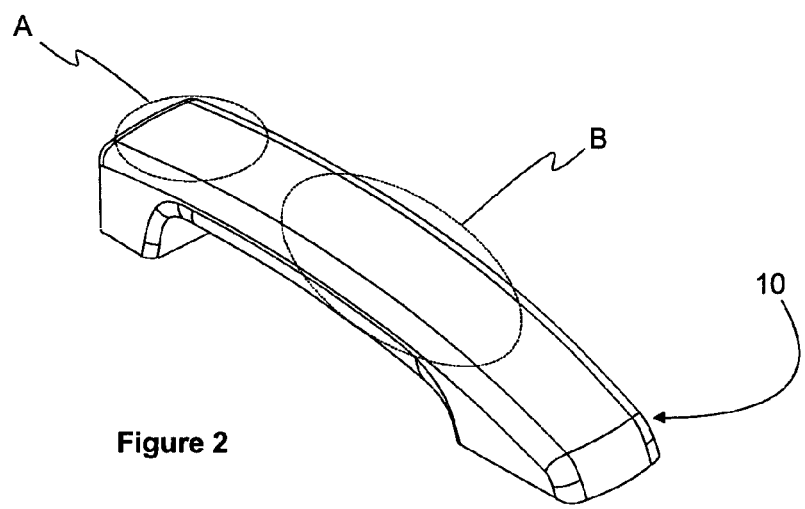
FIG. 2 is a three-dimensional view of a handle that is assembled and ready to be mounted on the opening.

FIGS. 1 and 2 reveal the issue behind the invention. A handle 10 for opening a motor vehicle (not represented) is required to accommodate various elements and must be assembled. In FIG. 1, said handle 10 is made up of at least two elements:
- a top part 20,
- a bottom part 40,
- miscellaneous elements, such as opening and closure mechanisms, electrical wires, sensors, etc. In FIG. 1, only the capacitive sensor 30 is shown in order not to overload the drawing.

The capacitive sensor 30 takes the form of a one-piece part incorporating the sensitive elements proper, and the electronic circuitry for conditioning the detected signal.

As represented in FIGS. 1 and 2, the handle 10 shown here is equipped with two detection areas A and B intended for two distinct controls. As an example, the first detection area A can be electronically assigned to control the locking of the opening and the second detection area B to the detection of proximity of the authorized person wanting to enter into the vehicle.

When the handle is assembled, that is to say the bottom part 40 is assembled with the top part 20 once the various mounting steps have been completed, the moisture present in the immediate environment will lead to the presence of water within the handle 10.

The invention proposes to circumvent the problem of the presence of moisture without seeking to do away with it absolutely.

Thus, the suggestion is to separate in a mutually seal-tight manner the different detection areas A, B of the capacitive sensor 30 since it is the presence of moisture at the same time over a plurality of detection areas that facilitates the coupling effects and renders the detections impossible or erroneous.

As illustrated in FIGS. 3a and 3b, the capacitive sensor 30 is provided with a seal 50 providing the means preventing the communication of the moisture between the areas A and B cited previously. This seal 50 can come from production (molding for example) with the capacitive sensor 30 or else be a part added to the sensor 30. A lip seal, for example, satisfactorily fulfils the seal-tightness requirement.

The aim of the invention is thus not to combat any trace of moisture or any risk of presence of moisture in the handle in the vicinity of the detection areas, but to prevent the moisture that is present in an area from communicating with another detection area.

As illustrated in FIG. 4, once the sensor 30 is placed in the bottom part of the handle 40, the seal 50 ensures the seal-tightness between the two detection areas A and B and prevents any moisture present in the vicinity of one of the areas from entering into direct contact with the moisture present in the vicinity of the other area. This eliminates the risk of coupling and associated interference.

The present invention is not limited to the single embodiment described, but covers any adaptation within the scope of those skilled in the art.

It is, for example, perfectly possible to envisage the handle 10 being able to have more than two detection areas, each area being individually separated from the others.

The embodiment provides for a handle comprising at least two elements (a top part 40 and a bottom part 20). It is, however, quite possible to produce a handle in a single hollow element into which the sensor 30 is then inserted.

The present invention is perfectly suited to capacitive sensors that are required to operate in an aquatic medium, which is not the case with the terrestrial motor vehicles described hereinabove.

The invention claimed is:

1. A sensing device, comprising:
   an enclosure (20,40);
   a capacitive sensor (30), enclosable within the enclosure, including a first capacitive detection area (A) and a second capacitive detection area (B); and
   preventive means that prevents, in a mutually seal-tight manner with the enclosure (20,40), communication of moisture between the first detection area (A) and the second detection area (B) effective to avoid capacitive coupling between the first detection area (A) and the second detection area (B),
   wherein the first capacitive detection area (A) is located at a first end of the enclosure, and the second capacitive detection area (B) is spaced from the first capacitive detection area (A) toward a second end of the enclosure, the preventive means located between the first capacitive detection area (A) and the second capacitive detection area (B),
   wherein both the first and second detection areas are mounted on a substrate located inside the enclosure, and
   wherein the preventive means is a seal extending around the substrate at a location on the substrate between the first and second detection areas, the seal having a thickness sufficient to cooperate with the enclosure to form a moisture-tight barrier between the first and second detection areas.

2. A handle (10) for opening a motor vehicle, comprising a sensing device as claimed in claim 1.

3. The sensing device as claimed in claim 1, wherein the enclosure forms a handle that is grippable by a hand of a user.

4. The sensing device as claimed in claim 1, wherein one or both of the first and second ends of the enclosure is exposed to moisture in the atmosphere.

* * * * *